United States Patent
Cordova et al.

(10) Patent No.: US 12,176,693 B2
(45) Date of Patent: Dec. 24, 2024

(54) WALL-MOUNTED PULL BOX FOR PREVENTING WIRE THEFT

(71) Applicant: Corbas Marketing, Inc., North Hollywood, CA (US)

(72) Inventors: Carlos Cordova, North Hollywood, CA (US); Sammy Vargas, North Hollywood, CA (US)

(*) Notice: Subject to any disclaimer, the term of this patent is extended or adjusted under 35 U.S.C. 154(b) by 171 days.

(21) Appl. No.: 18/098,028

(22) Filed: Jan. 17, 2023

(65) Prior Publication Data

US 2024/0243562 A1 Jul. 18, 2024

(51) Int. Cl.
H02G 3/08 (2006.01)
H02G 3/12 (2006.01)
H02G 3/14 (2006.01)

(52) U.S. Cl.
CPC ............ H02G 3/081 (2013.01); H02G 3/121 (2013.01); H02G 3/14 (2013.01)

(58) Field of Classification Search
None
See application file for complete search history.

(56) References Cited

U.S. PATENT DOCUMENTS

| | | | |
|---|---|---|---|
| 7,884,283 B1 | 2/2011 | Ousley | |
| 8,748,742 B1* | 6/2014 | Cordova | H02G 1/00 70/164 |
| 9,022,439 B2* | 5/2015 | Ousley | H02G 9/10 292/346 |
| 9,252,580 B2* | 2/2016 | Cordova | H02G 3/121 |
| 9,562,372 B2 | 2/2017 | Ulsh | |
| 9,890,566 B1 | 2/2018 | Davidson | |
| 10,547,168 B2 | 1/2020 | Tipton et al. | |
| 2009/0200056 A1 | 8/2009 | Moran | |
| 2010/0122826 A1 | 5/2010 | De La Borbolla | |
| 2011/0290802 A1 | 12/2011 | Burros | |
| 2014/0083146 A1* | 3/2014 | Ousley | E02D 29/1427 29/428 |
| 2014/0165368 A1* | 6/2014 | Cordova | H02G 3/121 411/102 |

* cited by examiner

*Primary Examiner* — Krystal Robinson
(74) *Attorney, Agent, or Firm* — McConnell Law Firm PC; Robert McConnell

(57) ABSTRACT

An electrical junction box (pull box) that is used for connecting electrical utilities to public fixtures such as streetlamps and stop lights and designed to be used in new construction with walls that can withstand the pressures and forces of having concrete poured around it. The pull box also includes improved security features including a security cover and a decorative cover. The security cover is secured to the pull box one or more oval shaped security nuts each fitted over a threaded post and locked down with a special security tool. The one or more threaded posts are secured to the pull box by novel high strength security brackets that are fitted to the rear of the pull box. The security nuts are fitted to the threaded posts in a recessed well that is covered by a threaded cover installed with a second special tool. Once the security cover is installed, a decorative cover is installed over the security cover typically with screws.

11 Claims, 7 Drawing Sheets

WALL-MOUNTED PULL BOX FOR PREVENTING WIRE THEFT

BACKGROUND OF THE INVENTION

Field of the Invention

The present invention relates to electrical junction boxes which are known as pull boxes and used to enclose interconnections between electrical power utility cables and electrical power distribution cables connected to devices such as municipal and highway street lighting fixtures, traffic signals and the like. More particularly, the invention relates to a novel theft-dissuading wall mounted pull box for use in new construction.

Electrical junction boxes are widely used to connect electrical power input cables of street lights installed along streets and highways to electrical power sources. Such junction boxes are often referred to as pull boxes. Wall-mounted type of pull boxes in common use consists essentially of an open-top, rectangular metal box which is inserted into a similarly shaped cavity or recess formed in a concrete highway or street barrier or sound wall. Commonly such pull boxes are installed after the highway/street barrier or sound wall is constructed. This is often an inefficient process as additional cutting and drilling is needed for installation.

Within the hollow interior space of a pull box shell, electrical interconnections or splices are made between copper wires of electrical utilities and power distribution cables leading to a lighting fixture or other electrical power consuming device. Usually, the interconnections include high-current fuses. After interconnecting splices have been made between electrical utility and power distribution cables which extend out through the exit conduit to a street light or other electrical device, a cover lid is installed on the pull box.

The cover lid of a wall-mounted pull box typically consists of a flat metal plate which is bolted to a pair of laterally opposed mounting flanges which extend from the upper edges of opposite vertical side panels of the pull box.

Pull boxes of the type described above are used extensively for such applications as providing electrical power to a row of light standards used to illuminate a street or highway. In such applications, electrical power from electrical utilities located near one of the light standards is supplied to a first light standard through electrical interconnections made between power cables entering the pull box through a first, electric utility source conduit and supply cables to the light standard exiting the pull box through a second, feeder conduit disposed between the pull box and the first light standard.

In a typical power distribution arrangement for a row of street or highway light standards, a first pull box which provides power to a first light standard in a row or chain, also has protruding into the interior space at the end of a third conduit which contains electrical wires that are disposed through the third conduit which runs under the surface of the ground to a second pull box located near a second light standard in a row of light standards.

Electrical connections are also made in the first pull box between the electrical utility cables and the cables leading to the second pull box, thus providing electrical power from the utility to the second light fixture. In this way, electrical power from a single power source is provided to a row of street lighting fixtures in a series of pull boxes containing interconnected electrical wires in an arrangement sometimes referred to as a "daisy chain."

Although the daisy chain power distribution arrangement of pull boxes described above is straight forward and efficient, problems have recently arisen when the arrangement is implemented with existing pull boxes, for the following reasons. In recent years, the price of copper has risen sharply, from a cost of one dollar U.S. per pound in December 2008 to approximately four dollars U.S. per pound in 2022. Because of the steep rise in the price of copper as a commodity, thieves have been motivated to engage in theft of copper wire which is then sold to scrap dealers.

One technique for stealing copper wire which has gained in popularity with thieves involves removing the lid of a pull box in a daisy-chain of pull boxes, removing the lid from an adjacent pull box in a daisy chain, freeing the ends of the wires in both pull boxes by cutting the wires, and pulling the freed lengths of wires out of one or the other of the pull boxes.

Prior solutions to the wire theft problem by the present inventors are outlined in U.S. Pat. No. 8,748,742 titled Wire Theft Protection for Pull Boxes (the '742 patent) and U.S. Pat. No. 9,252,580 titled Copper Wire theft Protection Method and Apparatus for Wall-Mounted Pull Boxes (the '580 patent). The '742 patent discloses a security apparatus and method to thwart wire theft ground-mounted pull boxes. The '580 patent discloses a security apparatus and method to thwart wire theft in wall mounted pull boxes. The '580 patent specifically discloses an apparatus for retro fitting existing pull boxes. The present invention relates to a novel security apparatus for wall mounted pull boxes designed for new construction.

SUMMARY OF THE INVENTION

The present invention is an electrical junction box (pull box) that is generally used for connecting electrical utilities to public fixtures such as streetlamps, stop lights and other electrical devices utilized and accessible by the public and designed for wall mounted installation. These pull boxes are used to connect the electrical power supply to the electrical device and are often installed during construction of cement walls, floors or other fixtures. These pull boxes provide access to the significant amounts of copper wire that are necessary to connect an electrical fixture to the public electrical supply or utility. Due to their public nature, pull boxes are often accessible to the general public. The rising cost of copper and the ease of access have made pull boxes the target of copper wire theft. If the cover of the pull box is easily removed, a thief may access the wire for quick removal. Removal of the electrical wire creates enormous replacement cost, traffic delays (for pull boxes located next to roads/highways) and safety risks when street/highway lighting is no longer functioning.

The pull box of the present invention is designed to be used in new construction. The walls and back of the improved pull box are made of a sturdy material such as steel so that the pull box can withstand the pressures and forces of having concrete poured around it. The improved pull box further includes openings for electrical wire or wire conduits that allow wires connected to the electrical supply to be connected through the pull box to electrical fixtures.

The present pull box also includes improved security features including a security cover and a decorative cover. The security cover is secured to the pull box one or more security nuts each fitted over a threaded post. In the preferred embodiment, the security nut is oval and is locked down with a special security tool. The one or more threaded posts are secured to the pull box by novel high strength security brackets that are fitted to the rear of the pull box. The security nuts are fitted to the threaded posts in a recessed well that is covered by a threaded cover installed with a second special tool. Once the security cover is installed, a decorative cover is installed over the security cover typically with screws.

The improved pull box can be manufactured out of a variety of high strength materials well known in the art such as steel, stainless steel, aluminum, high strength plastic/PVC, composite, concrete, HDPE, fiberglass or any other high strength material well known in the art. Any combination of manufacturing methods known in the art can be used to manufacture the box including casting, forging, welding, and CNC cutting.

DESCRIPTION OF THE PREFERRED EMBODIMENT

Figure 1:
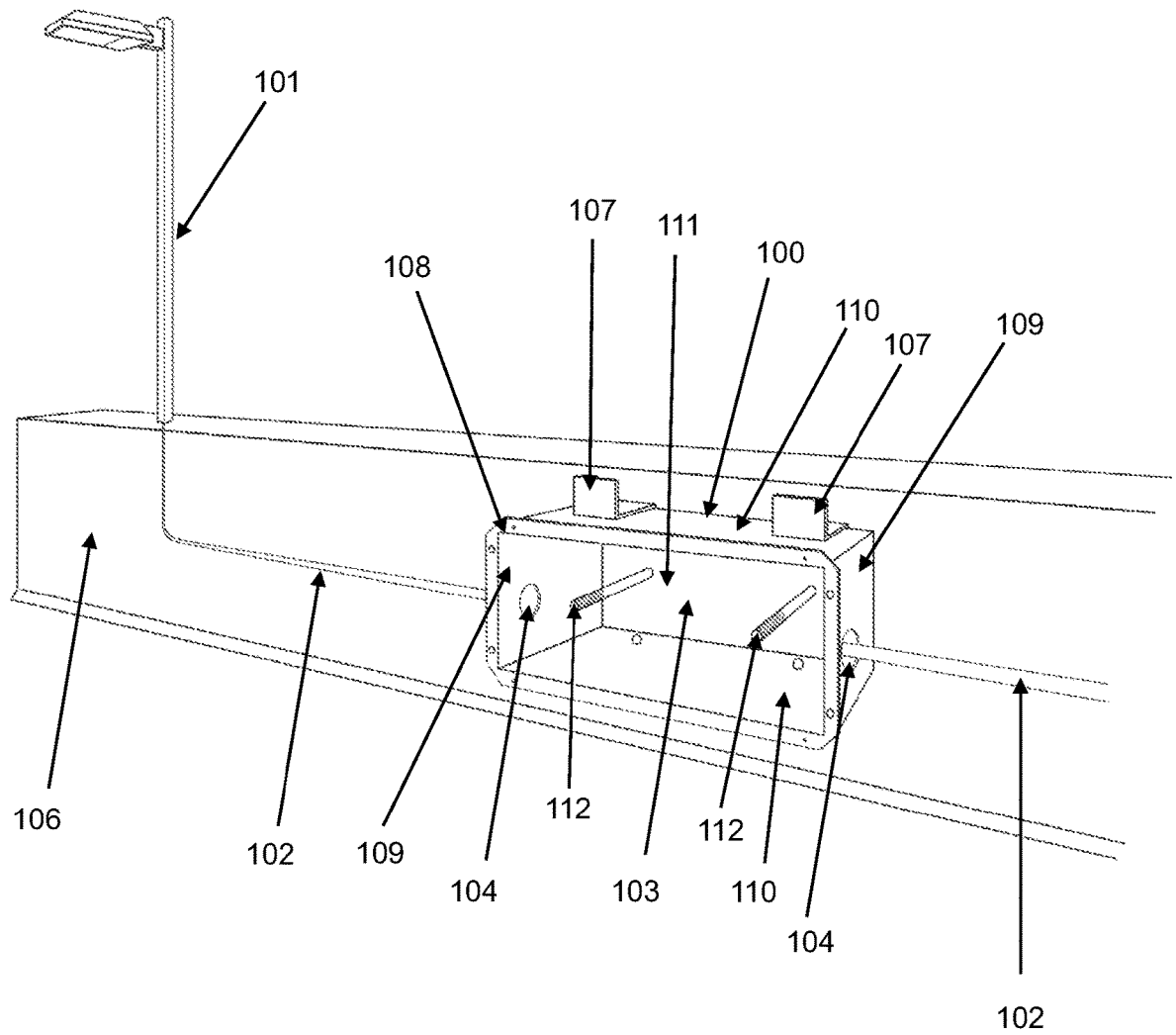
FIG. 1 is a view of the improved pull box installed in a wall with the cover removed.

The following detailed description refers to the preferred embodiment of the disclosed invention as shown in the attached figures and in the below description. This detailed description is not meant to limit the scope of the invention in any way but is intended to disclose the preferred embodiment/best mode of the invention at the time of filing this application.

The present invention is an electrical junction box (pull box) that is generally used for connecting electrical utilities to public fixtures such as streetlamps, stop lights and other electrical devices utilized and accessible by the public. These pull boxes are used to connect the electrical power supply to the electrical device and are often installed during construction of cement walls, floors or other fixtures. These pull boxes provide access to the significant amounts of copper wire that are necessary to connect an electrical fixture to the public electrical supply or utility. Due to their public nature, pull boxes are often accessible to the general public. The rising cost of copper and the ease of access have made pull boxes the target of copper wire theft. If the cover of the pull box is easily removed, a thief may access the wire for quick removal. Removal of the electrical wire creates enormous replacement cost, traffic delays (for pull boxes located next to roads/highways) and safety risks when street/highway lighting is no longer functioning.

Prior versions of pull boxes patented by this inventor were designed to retrofit existing pull boxes to add security features that prevent wire theft. The pull box of the present invention is designed to be used in new construction. The walls and back of the improved pull box are made of a sturdy material such as steel so that the pull box can withstand the pressures and forces of having concrete poured around it. The improved pull box further includes openings for electrical wire or wire conduits that allow wires connected to the electrical supply to be connected through the pull box to electrical fixtures.

The present pull box also includes improved security features including a security cover and a decorative cover. The security cover is secured to the pull box one or more security nuts each fitted over a threaded post. In the preferred embodiment, the security nut is oval and is locked down with a special security tool. The one or more threaded posts are secured to the pull box by novel high strength security brackets that are fitted to the rear of the pull box. The security nuts are fitted to the threaded posts in a recessed well that is covered by a threaded cover installed with a second special tool. Once the security cover is installed, a decorative cover is installed over the security cover typically with screws.

The improved pull box can be manufactured out of a variety of high strength materials well known in the art such as steel, stainless steel, aluminum, high strength plastic/PVC, composite, concrete, HDPE, fiberglass or any other high strength material well known in the art. Any combination of manufacturing methods known in the art can be used to manufacture the box including casting, molding, forging, welding, CNC cutting or any other manufacturing methods well known in the art.

FIG. 1 is view of the improved wall-mounted pull box for preventing wire theft 100 installed in wall 106. Street lamp 101 is also shown installed on or near wall 106 with electrical wire 102 shown routed from pull box 100 to lamp 101. Electrical wire 102 is also routed into pull box 100. Electrical wire 102 can be routed in or out of wire openings 104. In this view, wire openings 104 are shown on the vertical walls, but wire openings 104 could be on any combination of the horizontal walls 110, vertical walls 109 or rear wall 111. Pull box 100 may be constructed with one or more wire openings 104.

The improved wall-mounted pull box 100 is designed to be installed in new construction and made with sturdy wall materials. Pull box 100 is comprised of end walls 109, side walls 110 and rear wall 111, all of which are constructed of grade 2 steel in the preferred embodiment. The sturdy construction of end walls 109, side walls 110 and rear wall 111 allow pull box 100 to have concrete poured around it without any risk of collapse from the weight of the concrete. Further, pull box 100 includes opening lip 108. Opening lip 108 has one or more screw holes in the lip that allow attachment of the decorative cover (not shown). Opening lip 108 includes screw holes to attach the box cover but any means of attachment well known in the art could be used to attach the box cover to pull box 100. While steel construction is used in the preferred embodiment, any material well known in the art could be used to form the wall such as metals including stainless steel, aluminum, high strength plastic/PVC, composite, concrete, HDPE, fiberglass or any other high strength material well known in the art.

In this view, pull box 100 is shown without the decorative cover or security cover over opening 103. Threaded posts 112 are visible oriented vertically toward opening 103. The bases of threaded posts 112 are secured to novel security brackets 107 which are formed around the side and rear of the pull box. Further views of security brackets 107 and threaded posts 112 will be shown in later figures. Security nuts are fitted over threaded posts and secure the security cover to pull box 100.

As described above, the sturdy nature of the horizontal walls, vertical walls and back wall allow the improved pull box to be installed in new construction and to support the weight of concrete poured around the box. Security brackets 107 are firmly secured to the concrete wall and across the rear of pull box 100. The security brackets 107 provide a secure attachment point for the base of threaded posts 112. Security nuts, show in later figures, are recessed in the security cover and require a special and uncommon tool to remove from threaded posts. The security nuts are covered by a threaded cover, also requiring special tools to install/remove and a decorative cover is placed over the top of the box to prevent potential thieves from easily viewing the substantial security features of pull box 100.

Figure 2:
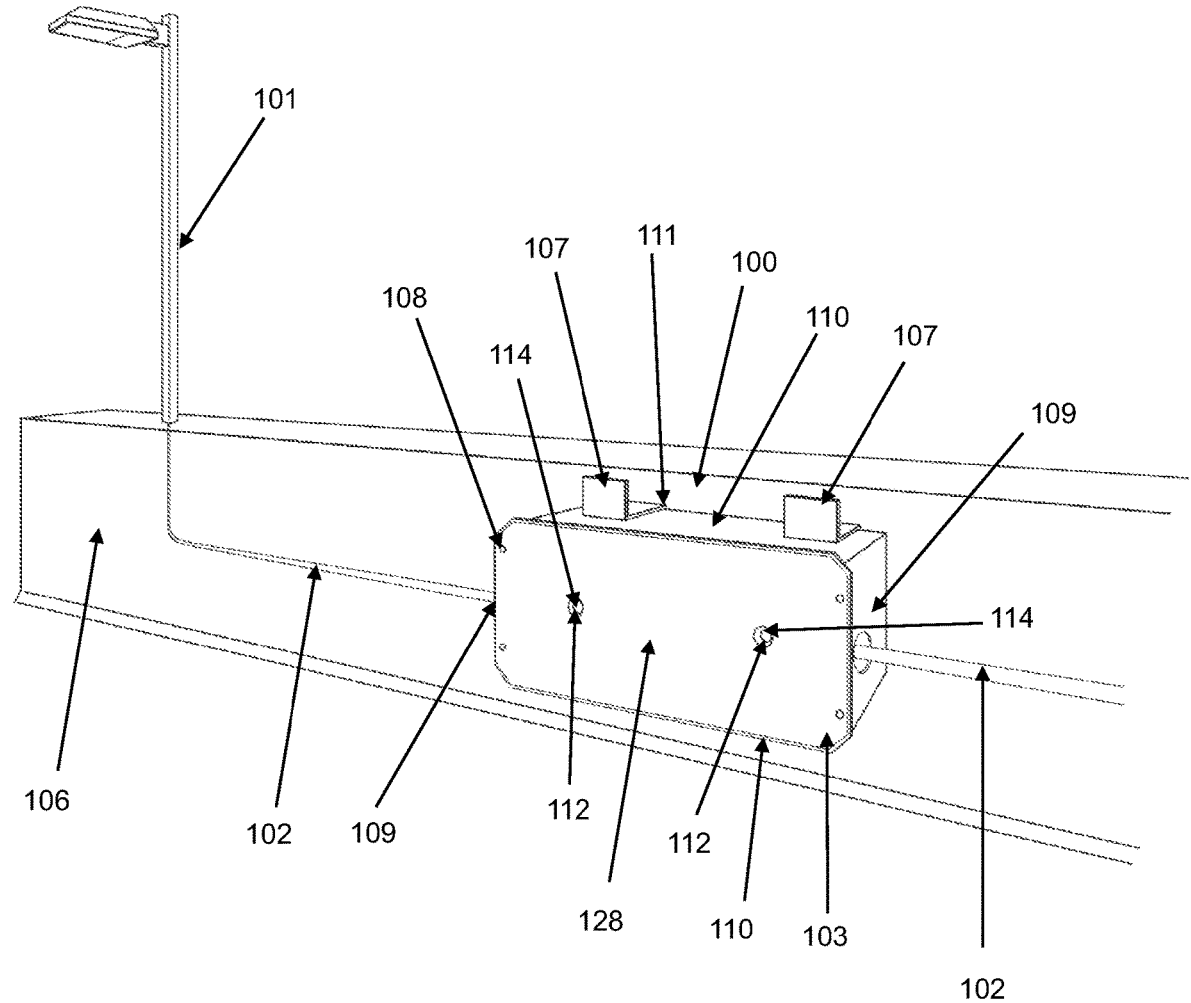
FIG. 2 is a view of the improved pull box installed in a wall with the installation cover in place.

FIG. 2 shows pull box 100 with installation cover 128 covering opening 103. Installation cover 128 is installed when pull box 100 is fitting into the wall and before pouring of concrete. Installation cover 128 prevents concrete from filling the interior of pull box 100.

Figure 3:
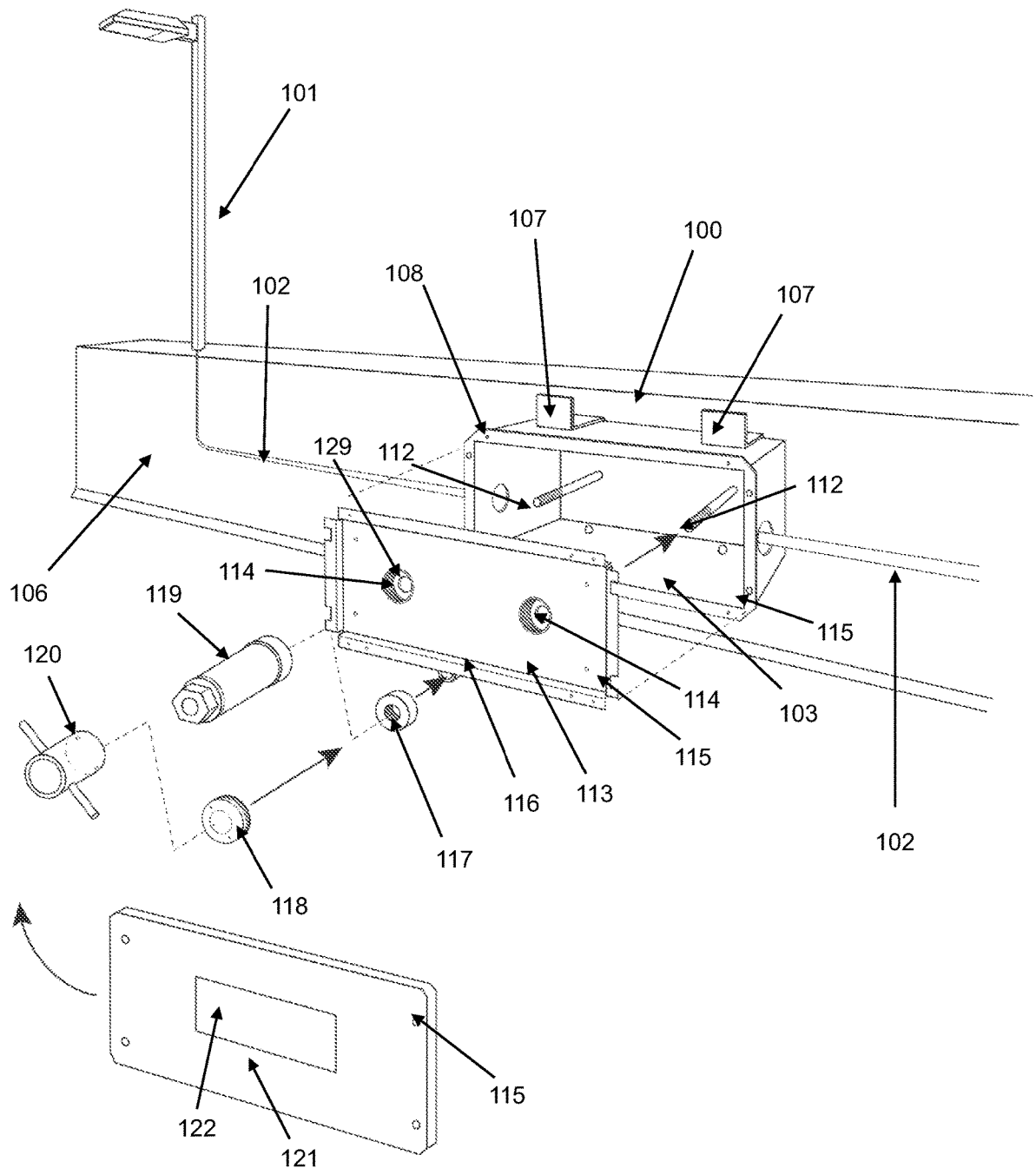
FIG. 3 is a perspective view of the improved pull box with all its constituent parts.

FIG. 3 shows pull box 100 with security cover 113, decorative cover 121 and the remaining parts shown. Security cover 113 is secured over opening 103 by threaded posts 112 which are anchored by security brackets 107. The top of threaded post 112 fits through recessed hole 114. Recessed hole 114 is a cavity sized such that security nut fits within the cavity and engages with flange 129 at the bottom of the cavity to secure the cover to threaded posts 112. Further, recessed hole 114 is sized to fit a specially sized tool that can be inserted in recessed hole 114 and turns the security nut. Security cover 113 has screw holes 115 and is made of the same material as pull box 100.

Security cover 113 is fitted to pull box 100 using the following steps. First: a spacer 116 is fitted over each threaded post 112. Second: security cover 113 is fitted over opening 103 so that recessed holes 114 are aligned with threaded posts 112 and screw holes 115 are aligned with screw holes 115 in opening lip 108. Third: Recessed hole flanges 129, located at the rear of recessed holes 114 and sized to rest on spacer 116 but allow threaded posts 112 to fit through them are rested on spacer 116 and threaded posts fitted into the cavity formed in recessed holes 114. Fourth: security nuts 117 are threaded on to threaded posts 112. Fifth: security nuts 117 are tightened on to threaded posts 112 using security nut tool 119 to secure security cover 113 to pull box 100. Sixth: recessed hole 114 is covered with threaded cover 118. Threaded cover 118 is installed with specific threaded cover tool 120. Seventh: Decorative cover 121 is installed over security cover 113 by threading screws through screw holes 115 and tightening the screws until the decorative cover is securely attached.

In the preferred embodiment, spacer 116 is a round metal tube sized to fit over threaded post 112. Further, spacer 116 can be made of any suitable material such as steel, stainless steel, aluminum, plastics or any other material well known in the art. Further in the preferred embodiment, security nuts 117 are unique oval shaped nuts formed of steel or other suitable high strength metal. The interior of security nut 117 is threaded to couple with complementary threads on threaded post 112. The oval shape of security nut 117 is unique and uncommon, thus requiring a special security nut tool 119. Security nut tool 119 includes a standard hex (six sided) nut on its first end. This standard hex nut can be operated with any number of standard wrenches or ratchet sets. The second end of security nut tool 119 includes a well that is a complementary shape to security nut 117 such that the end of security nut tool 117 fits securely over security nut 117 and allows the tool to rotate security nut 117. In the preferred embodiment, security nut 117 is oval shaped and security nut tool 119 includes a similarly sized and shaped oval well that securely couples with oval security nut 117 to allow rotation. Because the security nut 117 is fitted in the well of recessed hole 114, it is impossible to rotate and tighten without security nut tool 119.

Also in this preferred embodiment, threaded cover 118 is round with threads around the outer circumference. These are complementary to threads located on the inside of recessed holes 114. Threaded cover 118 also includes two circular wells near the outside edges of the cover. These circular wells match two posts on the threaded cover tool 120. The other end of threaded cover tool 120 includes a perpendicular bar oriented for to allow for easy rotation of the tool. Threaded cover 118 is threaded into recessed hole 114, rotated in place with threaded cover tool 120 and fixed securely to cover recessed holes 114. The requirement to use two separate, unique tools to remove the security cover 113 make it highly unlikely that any thief will be able to remove the wire from pull box 100. Decorative cover 121 is generally manufactured of the same material as the rest of the pull box 100 and includes text plate 122 for engraving important information such as the owner of the pull box 100, details about the wiring contents or other necessary information.

In other embodiments, other configurations of spacer 116, security nut 117, security nut tool 119, threaded cover 118 and threaded cover tool 120 are anticipated. These alternative embodiments may also be constructed of any suitable material well known in the art such as steel, stainless steel, aluminum, fiberglass or plastics.

Figure 4:
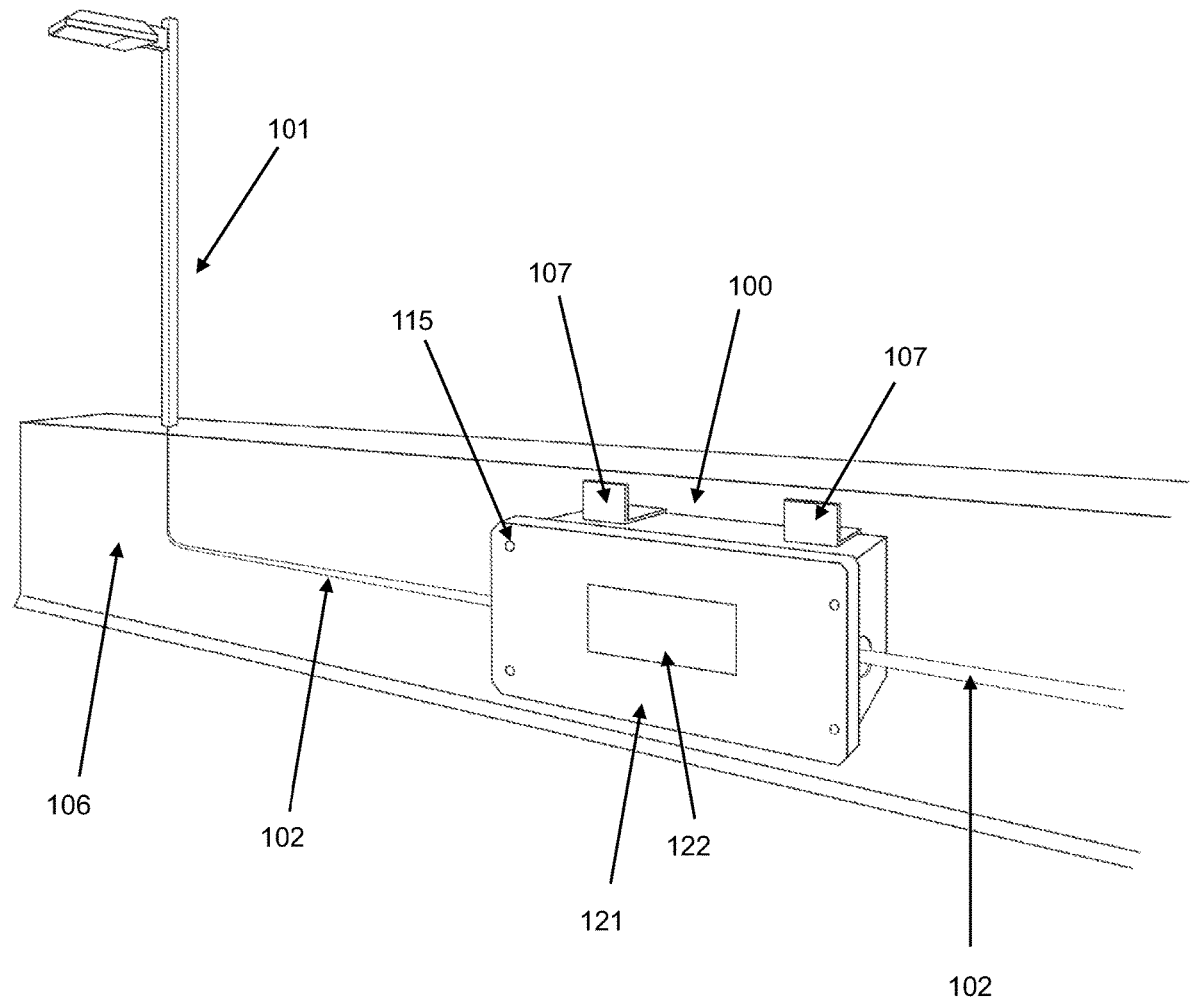
FIG. 4 is a view of the improved pull box with the decorative cover installed.
Figure 5A:
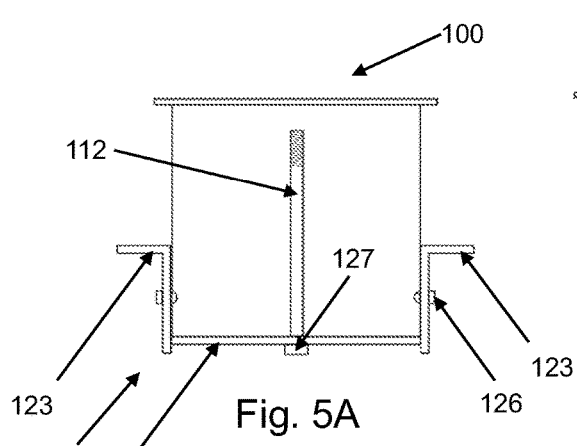
FIG. 5A is an end view of the improved pull box.

FIG. 4 shows a view of pull box 100 with decorative cover 121 installed and secured. In this view, the decorative cover 121 provides text plate 122 for location of key information related to pull box 100. Decorative cover 121 hides security cover 113 and the various security features of the pull box 100 from the prying eyes of thieves. FIGS. 5A-5D show side, top and bottom views of pull box 100. FIG. 5A shows an end view of pull box 100. In this view, threaded post 112 is visible. The components of security bracket 107 are shown including security bracket base 124 and security bracket flange 123 on either side of pull box 100. Security bracket 107 is attached to pull box 100 by threaded post base 127 and bracket attachments 126. Threaded post base 127 and bracket attachment 126 may be secured by any means well known in the art including welding, riveting, screws, and/or adhesives. While this configuration is utilized in the disclosed preferred embodiment, may different configurations of security bracket 107, attachment points and attachment methods may be used.

Figure 5B:
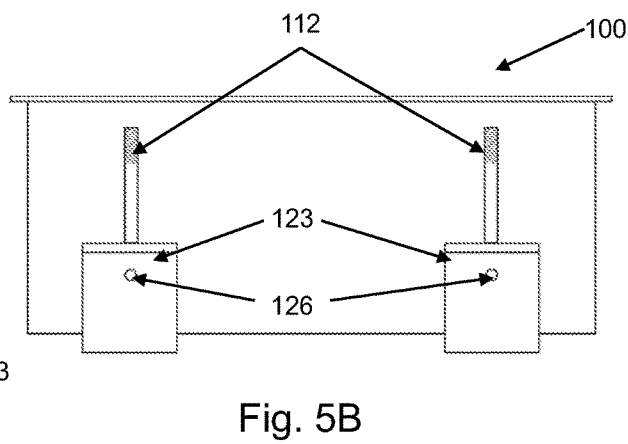
FIG. 5B is a side view of the improved pull box.

FIG. 5B shows a side view of pull box 100. In this view, threaded posts 112, security bracket flange 123 and bracket attachments 126 are shown.

Figure 5C:
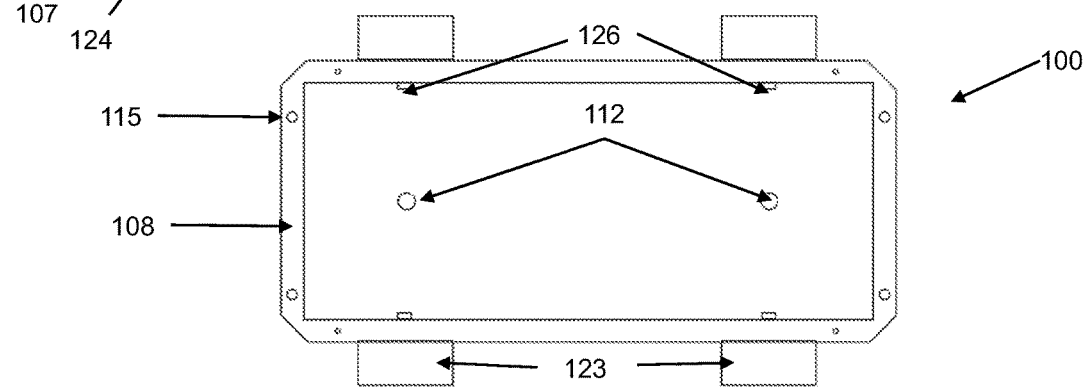
FIG. 5C is a top view of the improved pull box.

FIG. 5C shows a top view of pull box 100 with threaded posts 112, security bracket flanges 123, bracket attachments 126, opening lip 108 and screw holes 115 shown.

Figure 5D:
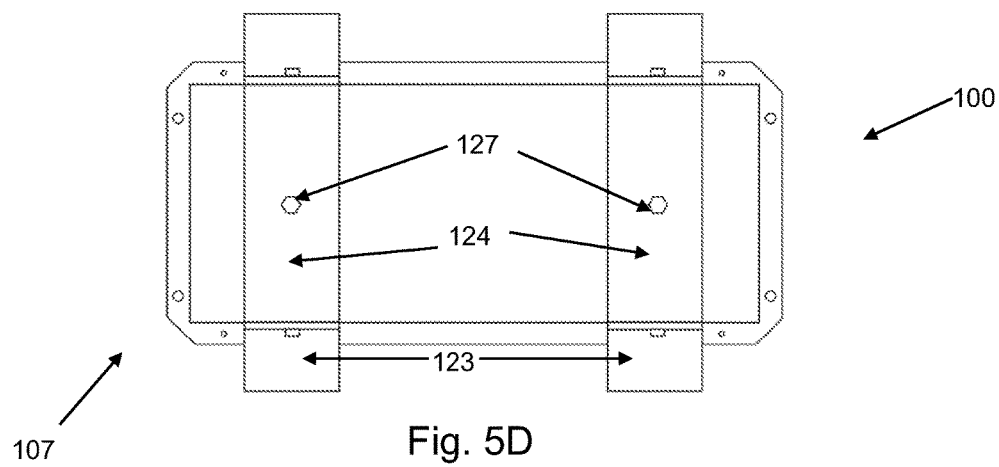
FIG. 5D is a bottom view of the improved pull box.

FIG. 5D shows a bottom view of pull box 100 with security bracket 107, security bracket base 124, security bracket flanges 123 and threaded post base 127 visible.

Figure 6:
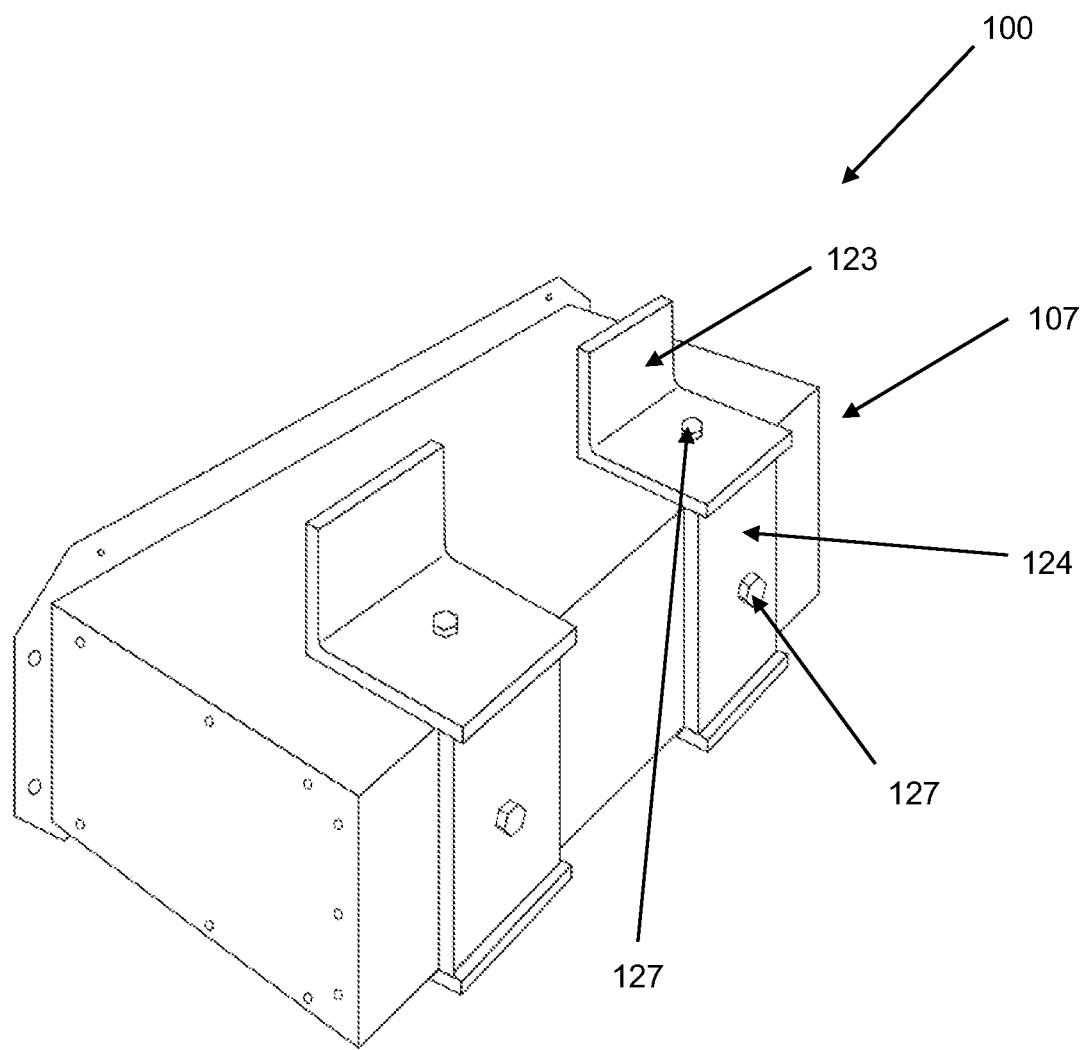
FIG. 6 is a perspective rear view of the improved pull box.

FIG. 6 shows a perspective view of the rear of pull box 100. In this view, the component parts of security bracket 107 are visible. Security bracket 107 is comprised of security bracket flanges 123 and security bracket base 124. The security bracket 107 is attached to pull box 100 by threaded post base 127 and bracket attachments 126. Security bracket is made of any high strength material, but in the preferred embodiment steel. Other suitable materials include sheet metal, aluminum, stainless steel, alloys and high strength plastic. Assembly methods include welding, casting and other metal fabrication methods known in the art. Attachment methods include welding, riveting, screws, adhesives, and/or any other attachment methods well known in the art.

Figure 7A:
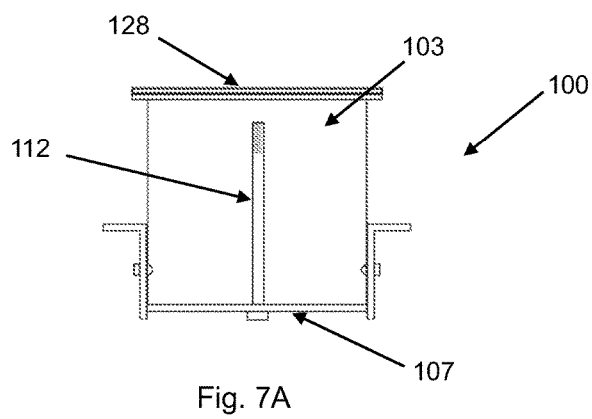
FIGS. 7A-7G are views of the installation steps of the improved pull box.

FIG. 7A is an end view of pull box 100 in configuration for the first step of the installation process, specifically when pull box 100 is fitted in a wall and before concrete is poured around the box. In this view, installation cover 128 is covering opening 103. Threaded post 128 is fixed to security bracket 107.

Figure 7B:
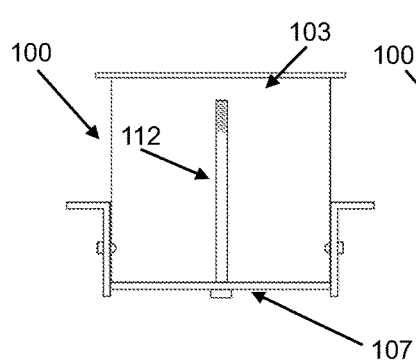

FIG. 7B is a view of the second step of the installation process of pull box 100. In this view, pull box 100 is installed in the wall and concrete has been poured around the box. No cover is placed over opening 103. In this state, any electrical work and/or connections may be completed and finalized before closing and securing pull box 100. Threaded post is fixed to security bracket 107 in this view.

Figure 7C:
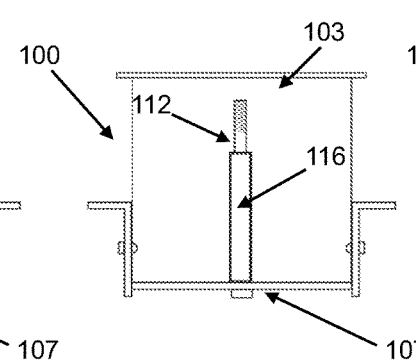

FIG. 7C is a view of the third step of the installation process for pull box 100. In this view, preparations for installing the security cover and decorative cover are being made. Spacer 116 is placed over threaded post 112 prior to placing security cover 113 over the opening 103 of pull box 100.

Figure 7D:
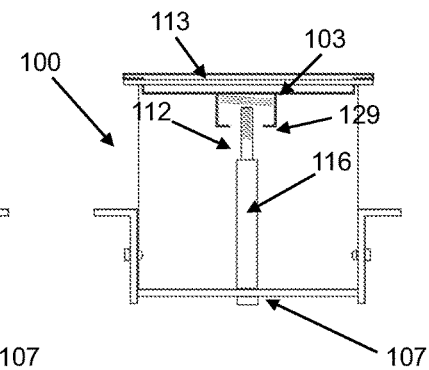

FIG. 7D is a view of the third step of the installation process for pull box 100. Security cover 113 is placed over opening 113 in preparation for installation of security nut 117.

Figure 7E:
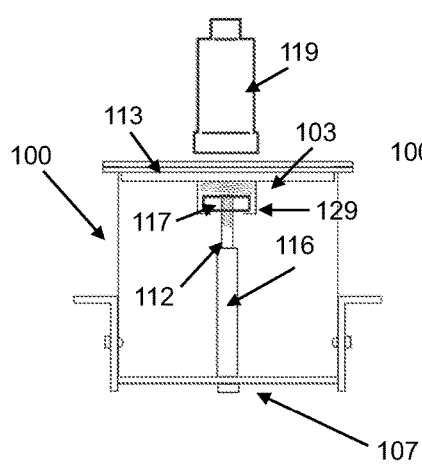

FIG. 7E is a view of the fourth step of the installation process for pull box 100. Security nut 117 is threaded over threaded post 112 and security nut tool 119 is being used to tighten security nut 117 to fix it in place. Security cover 113 is held in place by security nut 117 being tightened down on flange 129.

Figure 7F:
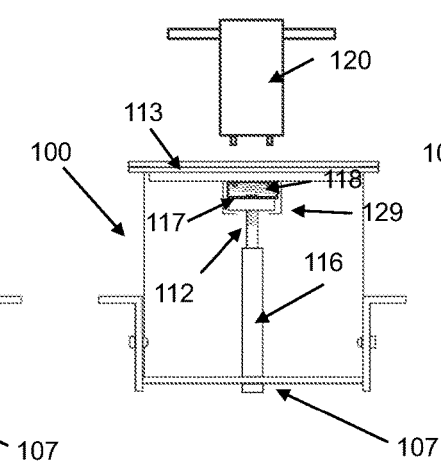

FIG. 7F is a view of the fifth step of the installation process for pull box 100. Security nut 117 is tightened down on threaded post 112. Threaded cover 118 is threaded into place and then fixed with threaded cover tool 120.

Figure 7G:
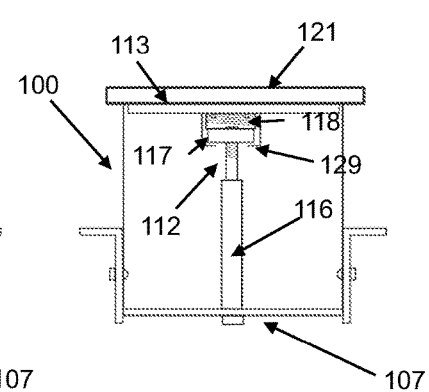

FIG. 7G is a view of the sixth step of the installation process for pull box 100. In this view, decorative cover 121 is installed over security cover 113. In this configuration, all the security features of this improved pull box 100 are active, making it very difficult for wire thieves to access the valuable wire contained within the box.

Although the present invention has been described in relation to the above disclosed preferred embodiment, many modifications in design, implementation, systems and execution are possible while still maintaining the novel features and advantages of the invention. The preferred embodiment is not meant to limit the scope of the patent in any way, and it should be given the broadest possible interpretation consistent with the language of the disclosure on the whole.

The invention claimed is:

1. A wall-mounted pull box for electrical wiring comprising:
    two end walls, two side walls and a back wall;
    a front opening for accessing the electrical wiring in the pull box;
    at least one conduit opening for routing the electrical wiring into and out of the pull box;
    at least one security bracket oriented essentially parallel with the back wall;
    at least one threaded post comprising a threaded end and an attachment end where the attachment end is secured to the security bracket and the threaded end is accessible through the front opening;
    a spacer that fits over the threaded post;
    a security cover comprising at least one recessed hole oriented to fit over the threaded end of the threaded post;
    a security nut with internal threads complementary to the threads of the threaded end of the threaded post, where the security nut when rotated, utilizing a security tool, around the threaded end of the threaded post reaches a locked position where the security nut secures the security cover over the front opening of the pull box and where the security nut, when in its locked position, fits fully within the recessed hole;
    a threaded cover with threads around the outer perimeter of the threaded cover where the threads around out the outer perimeter fit into complementary threads located on the interior perimeter of the recessed hole and when the threaded cover is rotated with a threaded cover tool, the threaded cover fits over the recessed hole; and
    a decorative cover that is attachable and detachable over the security cover.

2. The wall-mounted pull box of claim 1 where the two end walls, two side walls, back wall, security cover and decorative cover are made from a material selected from the group comprising steel, stainless steel, aluminum, high strength plastic/PVC, composite, concrete, HDPE, and fiberglass.

3. The wall-mounted pull box of claim 1 where the pull box is manufactured using a method selected from the group comprising casting, molding, forging, welding, and CNC cutting.

4. The wall-mounted pull box of claim 1 where the security bracket is comprised of a security bracket base and at least one security bracket flanges.

5. The wall-mounted pull box of claim 1 where the security bracket is made from a material selected from the group comprising steel, stainless steel, aluminum, high strength plastic/PVC, composite, concrete, HDPE, and fiberglass.

6. The wall-mounted pull box of claim 1 where the spacer is a tubular shape.

7. The wall-mounted pull box of claim 1 where the security nut is oval shaped.

8. The wall-mounted pull box of claim 1 where the security tool is comprised of a first end and a second end, where the first end is a standard hex nut with six sides and the second side is a complementary shaped to fit over, couple with, and rotate the security nut.

9. The wall-mounted pull box of claim 1 where the threaded cover includes two wells located around the perimeter of the threaded cover and where the threaded cover tool includes two posts that are sized to couple with the two wells of the threaded cover to enable rotation of the threaded cover.

10. The wall-mounted pull box of claim 1 further comprising an installation cover that is installed while concrete is poured around the pull box.

11. The wall-mounted pull box of claim 1 where the security cover and decorative cover include screw holes around the perimeter that allow the decorative cover to be attached and detached from the pull box by inserting or removing screws from the screw holes.

* * * * *